Oct. 14, 1969     R. C. SCHLINGER ET AL     3,472,157
BRAKE FOR TWINE ARM OF TYING MACHINE
Filed Feb. 8, 1968
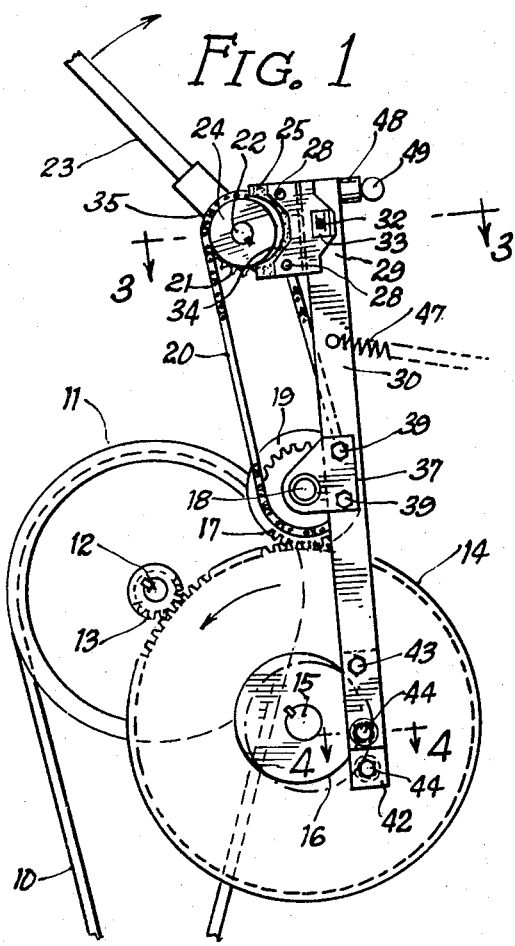
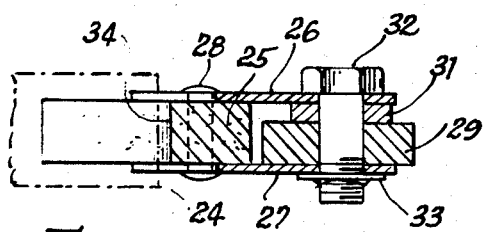
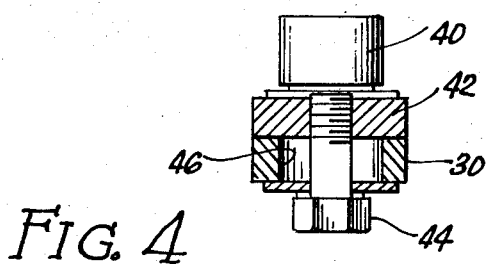
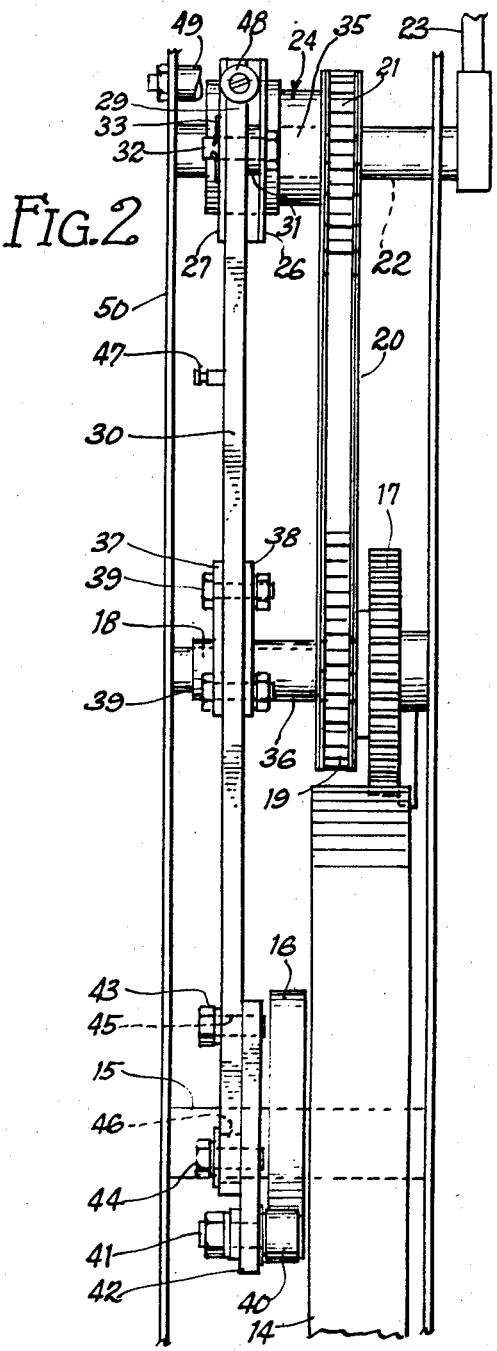
INVENTORS
Robert C. Schlinger
John R. Hall
Davis, Lucas, Brewer
and Brugman
Attys

3,472,157
BRAKE FOR TWINE ARM OF TYING MACHINE
Robert Charles Schlinger, Palos Park, and John Robert Hall, Chicago, Ill., assignors to B. H. Bunn Company, Chicago, Ill., a corporation of Illinois
Filed Feb. 8, 1968, Ser. No. 704,159
Int. Cl. B65b 13/10
U.S. Cl. 100—27               5 Claims

ABSTRACT OF THE DISCLOSURE

An improved brake for the twine arm of a bundle tying machine wherein the brake is comprised of a friction shoe mounted on one end of a pivoted lever and adapted to bear against a twine arm driving sleeve, the opposite end of the lever having a roller follower bearing against a cam on a driving element for the sleeve, the cam serving to rock the lever and its shoe toward and away from the said twine arm driving sleeve to apply or release the brake.

---

This invention relates to bundle tying machines and particularly to a brake mechanism for the twine arm thereof.

In the tying of bundles by a reach of twine, it is necessary to wrap the twine at least once around the bundle while the bundle is at rest on a table supplied with the machine. The means by which the twine is wrapped around the bundle may comprise an arm which is pivoted to swing around the bundle while it is on the table and which carries the twine with it as it rotates around the bundle. After the arm has wrapped the twine around the bundle, the arm is brought to rest and held there while the knot-tying mechanism operates upon the twine to tie a knot and sever the tied twine from the remainder of the twine on the arm in the machine.

It may be appreciated that the twine arm, in making its swing around the bundle, aquires an appreciable amount of momentum which must be absorbed when the twine arm is brought to rest so that the knotting function can proceed. The means for absorbing the momentum comprises a brake which, for many years, has taken the form of a piece of leather stretched between the ends of a bowed sheet of metal secured to the tying machine frame, the arm and stretched strip of leather being so disposed relative to one another that the arm frictionally engages the leather at the end of its wrapping cycle. At the end of the tying cycle the severed end of the twine remains at the knotter and extends outwardly to he arrested twine arm, and then along the twine arm through a hollow driving sleeve or shaft for the twine arm and out to a suitable source of supply. The end of the arm to which the twine is connected has to be located below the table on which the article to be tied is supported so that the twine is not engaged by the bundle to be tied while the latter is placed upon the table. This results in the brake mechanism extending outwardly from the side of the machine and generally increases the size of the machine. An example of a leather strip type brake for a tying machine is shown in B. H. Bunn Patent 2,451,197 dated Oct. 12, 1948.

It is an object of this invention to provide a brake mechanism for the twine arm of a bundle tying machine wherein the brake mechanism is compact and so located on the tying machine as not to extend beyond the minimum confines required for the remainder of the machine.

A more specific object of this invention is the provision of a brake shoe type of brake in place of a frictionally engaged leather strip, the brake shoe cooperating with a drive element for the twine arm rather than with the twine arm itself.

These and other objects of this invention will become apparent from the following detailed description of a preferred embodiment of the invention when taken together with the accompanying drawings in which:

FIG. 1 is a fragmentary rear elevational view of a typical twine tying machine to which the brake of this invention has been applied;

FIG. 2 is a side elevational view on an enlarged scale of the brake mechanism, the view being taken from the right hand side of FIG. 1;

FIG. 3 is an enlarged fragmentary plan view in section of the brake mechanism taken along line 3—3 of FIG. 1; and FIG. 4 is an enlarged fragmentary plan view in section of the drive mechanism for the brake taken along line 4—4 of FIG. 1.

Referring now to the drawings for a detailed description of the invention, the novel brake mechanism is applied to the twine arm driving mechanism of the machine rather than to the twine arm itself as in prior designs. This mechanism is comprised, in the form selected to illustrate the invention, of a belt 10 driven from a suitable source of power and which drives a pulley 11, on the shaft 12 of which is mounted a drive pinion 13. Said pinion 13 meshes with a driven gear 14 keyed to and mounted on a shaft 15 on which is also keyed a cam 16 for rotation with said shaft 15. Gear 14 drives a smaller gear 17 mounted on a shaft 18, and to gear to 14 is affixed a drive sprocket 19 which is connected by a chain 20 to a driven sprocket 21 keyed to a shaft 22 for driving a twine arm 23.

Sprocket 21 has a hub 24 of relatively large size which extends axially for some distance and forms the friction element against which the brake of this invention operates to arrest shaft 22 and the twine arm 23 driven thereby. The means by which this is done will now be described.

Cooperating with hub 24 is a semi-circular brake shoe 25 which, as shown in FIG. 3, is secured to a pair of spaced plates 26, 27 by one or more rivets 28. Said plates are secured to the upper end 29 of a brake arm 30. Said arm 30 may be a simple bar of steel having a substantially rectangular cross-section, the thickness of which may be less than the distance between plates 26 and 27, so that a spacer 31 may be inserted between the upper end 29 of the arm 30 and one of said plates, such as 26. A bolt 32 passes through plates 26 and 27 and through spacer 31 and upper end 29 of arm 30 so as to hold these elements together, said bolt being in turn held in the assembly by a distortable type stamped metal washer 33 commonly referred to as a Tinnerman speed nut. Brake shoe 25 has an inner semicylindrical surface 34 which is adapted to bear against the outer cylindrical surface 35 frictionally to arrest the rotation of the hub 24, its associated shaft 22 and twine arm 23.

Brake arm 30 is provided with a relatively long hub 36 mounted on shaft 18 and secured to arm 30 by spaced brackets 37, 38. Said brackets 37 and 38 may be welded or otherwise secured to said hub 36 so as to be movable therewith, and are secured to brake arm 30 by appropiate bolts 39.

It is contemplated that brake arm 30 will be rocked about shaft 18 on hub 36 so as to bring brake shoe 25 to bear against hub 24, or to free it therefrom. The means for rocking brake arm 30 comprises a roller follower 40 which rides upon cam 16 and is mounted on a bolt 41 (FIG. 4) secured to the lower end of an adjustable bracket 42. Said bracket 42 is mounted on the lower end of brake arm 30 by a pair of screws 43, 44 passing through suitable openings 45 and 46, respectively, in said arm. Opening 45 is designed to receive screw 43 with a loose fit and opening 46 is considerably larger than screw 45 so that bracket 42 may be swung about screw 43 through a small angle to bring roller 40 closer to or farther away from shaft 15 on which cam 16 is mounted. When the desired position of bracket 42 relative to arm 30 is determined, the bracket is locked to said arm by tightening screws 43 and 44.

Thus, by selecting an appropriate position for bracket 42 relative to arm 30, the limiting positions of shoe 25 may be determined and thereby the amount of pressure exerted by said shoe 25 upon the hub 24 may likewise be determined. The speed of movement of shoe 25 is determined in turn by the shape of cam 16 as is also the timing of the application of the brake shoe to hub 24 in relation to the operation of gear 14 and shaft 15. Thus, if the latter is associated with other mechanisms in the tying machine, twine arm 23 can be made to be arrested at the end of its cycle and then released just prior to the commencement of its next cycle.

To avoid unnecessary noise, a spring 47 may be used to hold a rubber bumper 48 secured to the upper end of arm 30 against a back stop 49 appropriately secured to a mounting plate 50 on the tying machine.

It may be observed that the entire brake mechanism, including arm 30, cam 16, brake shoe 25 and the brake surface 35 is disposed within the confines of the mechanisms already existing in the typing machine and hence no allowance for extra space for the brake mechanism need be made. Furthermore, the braking force is more readily controllable and can be made greater than that normally available with the leather type of brake mentioned above.

We claim:

1. In combination, a twine arm rotatable about a predetermined axis, means for driving said arm, said means comprising a drive shaft, a drive gear mounted on and rotatable with said drive shaft, a countershaft, a pinion gear on said countershaft driven by said drive gear, positive drive means connecting the pinion gear and the twine arm for driving the twine arm from the pinion gear, a cylindrical member driven by said positive drive means, and a brake for the twine arm comprising a lever pivoted between its ends, a brake shoe on one end of said lever and adapted frictionally to engage the cylindrical member, a cam on the drive shaft and rotatable therewith, a follower on the opposite end of the lever and engaging the cam to rock said lever and brake shoe against the cylindrical member to stop said cylindrical member and twine arm.

2. The combination described in claim 1, wherein the lever is pivoted on the countershaft.

3. The combination described in claim 1, further characterized by means for adjustably mounting the follower on the lever.

4. The combination described in claim 1, said opposite end of said lever comprising a bar overlying said lever, means securing one end of said bar to the lever, said follower being mounted on the bar, a pin-and-slot connection between the bar and lever removed from the means securing one end of said bar to the lever, and means for fixing the bar to the lever at the slot.

5. The combination described in claim 1, said positive drive means comprising a sprocket on the countershaft driven by the pinion gear, a driven shaft secured for rotation with the twine arm, a sprocket keyed to the driven shaft for the twine arm, and a chain connecting said sprockets, said cylindrical member comprising a cylindrical hub on the sprocket keyed to the driven shaft for the twine arm.

References Cited

UNITED STATES PATENTS

| | | | |
|---|---|---|---|
| 2,451,197 | 10/1948 | Bunn | 100—27 |
| 2,776,684 | 10/1956 | Newmaster et al. | 100—19 |
| 3,385,206 | 5/1968 | Brown et al. | 100—27 |

FOREIGN PATENTS

| | | |
|---|---|---|
| 200,937 | 2/1956 | Australia. |

BILLY J. WILHITE, Primary Examiner